(12) United States Patent
Haverinen et al.

(10) Patent No.: US 7,085,808 B2
(45) Date of Patent: Aug. 1, 2006

(54) METHOD FOR DISTINGUISHING CLIENTS IN A COMMUNICATION SYSTEM, A COMMUNICATION SYSTEM; AND A COMMUNICATION DEVICE

(75) Inventors: Henry Haverinen, Tampere (FI); Jari T. Malinen, Mountain View, CA (US)

(73) Assignee: Nokia Corporation, Espoo (FI)

( * ) Notice: Subject to any disclaimer, the term of this patent is extended or adjusted under 35 U.S.C. 154(b) by 730 days.

(21) Appl. No.: 09/876,480

(22) Filed: Jun. 7, 2001

(65) Prior Publication Data

US 2002/0194353 A1    Dec. 19, 2002

(51) Int. Cl.
*G06F 15/13* (2006.01)
(52) U.S. Cl. .................. 709/203; 707/102; 455/433; 455/522
(58) Field of Classification Search ................ 709/203; 707/102; 455/433, 522
See application file for complete search history.

(56) References Cited

U.S. PATENT DOCUMENTS

| | | | |
|---|---|---|---|
| 5,526,489 A | | 6/1996 | Nilakantan et al. .... 395/200.02 |
| 6,044,277 A | * | 3/2000 | Tsuda .......................... 455/522 |
| 6,304,564 B1 | * | 10/2001 | Monin et al. ............... 370/338 |
| 6,487,557 B1 | * | 11/2002 | Nagatomo .................. 707/102 |
| 6,654,607 B1 | * | 11/2003 | Shobatake et al. .......... 455/433 |
| 2002/0191795 A1 | * | 12/2002 | Wills | |

OTHER PUBLICATIONS

"Adapting to Network and Client Variability via On-Demand Dynamic Distillation", Fox et al., Sep. 1996, pp. 160-170.
"Dynamic Adaptation in an Image Transcoding Proxy for Mobile Web Browsing", Han et al, Dec. 1998, pp. 8-17.

* cited by examiner

*Primary Examiner*—John Follansbee
*Assistant Examiner*—Jinsong Hu
(74) *Attorney, Agent, or Firm*—Perman & Green, LLP.

(57) ABSTRACT

The invention relates to a method for distinguishing clients in a communication system comprising at least one wireless access network and at least one wired access network. The wireless access network comprise means for connecting wireless clients in communication to the wireless access network. Wired access network comprise means for connecting wired clients in communication to the wired access network. Communication system comprise means for communicating between the access network and the wired access network. In the method a resolution request message is transmitted to the communication system indicating a client to be examined, the message is received in at least one other node. A decision whether a resolution reply message is to be transmitted to the communication system is performed on the basis of a resolution reply message.

37 Claims, 7 Drawing Sheets

METHOD FOR DISTINGUISHING CLIENTS IN A COMMUNICATION SYSTEM, A COMMUNICATION SYSTEM; AND A COMMUNICATION DEVICE

FIELD OF THE INVENTION

The present invention relates to a method for distinguishing clients in a communication system comprising at least one wireless access network and at least one wired access network, said at least one wireless access network comprising means for connecting at least one wireless client in communication to said at least one wireless access network, said at least one wired access network comprising means for connecting at least one wired client in communication to said at least one wired access network, and said communication system comprising means for communicating between said at least one wireless access network and said at least one wired access network. The invention also relates to a communication system comprising at least one wireless access network and at least one wired access network, said at least one wireless access network comprising means for connecting at least one wireless client in communication to said at least one wireless access network, said at least one wired access network comprising means for connecting at least one wired client in communication to said at least one wired access network, and said communication system comprising means for communicating between said at least one wireless access network and said at least one wired access network. The invention further relates to a communication device comprising means for communicating with a communication system comprising at least one wireless access network and at least one wired access network, said at least one wireless access network comprising means for connecting at least one wireless client in communication to said at least one wireless access network, said at least one wired access network comprising means for connecting at least one wired client in communication to said at least one wired access network, and said communication system comprising means for communicating between said at least one wireless access network and said at least one wired access network.

BACKGROUND OF THE INVENTION

There are communication systems which comprise both wired and wireless access network. Such a communication system typically comprises at least one server and a number of clients. The clients can communicate with the server and other clients through different parts of the network. The wireless access network has one or more access point devices. The wireless clients can have access to the wireless access network through the access point devices. On current wireless access networks access point devices typically operate as link layer bridges between a wired access network such as Ethernet and the wireless access network such as WLAN. The wired access network and the wireless access network usually belong to a single IP sub-network. Every device (client, server, access point, etc.) connected to the network must have a unique IP address which is used when the device sends packets to the network and when unicast or multicast packets are sent via the network to the device. Normally such an IP sub-network has an address range in which addresses of all the devices of the sub-network belong.

Situations may exist in which transmission of information should be restricted only to the wired access network or to the wireless access network of the communication system. For example, the transmitting device is not aware of if the transmission in the wireless access network is encrypted or not. Consequently, transmission of any confidential information to the wireless access network should be prevented to avoid eavesdropping of the information. However, in current communication systems it is not possible to automatically distinguish which devices are connected to the wired access network and which devices are connected to the wireless access network of the IP sub-network. Therefore the configuration of the devices has to be performed manually. This means that the access points of the communication system have to be pre-configured with the IP addresses or address ranges of the wired nodes and/or the wireless nodes of the communication system.

There may also be situations in which direct transmission from a wireless client to another wireless client should be prevented. This means that the access point through which the transmitting wireless client communicates with the network should have the information whether the receiving client is connected to the wireless access network or to the wired access network. In prior art systems, the only way to inform the access point is manual configuration, which is time consuming and every time a new client is inserted to or removed from the communication system the configuration has to be performed again.

SUMMARY OF THE INVENTION

It is an aim of the present invention to provide a method for distinguishing a client belonging to a wireless access network from a client belonging to a wired access network. The invention is based on the idea that a resolution request message is transmitted from a requesting node to the network. According to a first advantageous embodiment of the invention a resolution reply message is transmitted to the requesting node only if the client belongs to the wired access network. According to a second advantageous embodiment of the invention a resolution reply message is transmitted to the requesting node only if the client belongs to the wireless access network. More precisely, the method according to the present invention is primarily characterized in that the method comprises at least the following steps:

a transmission step for transmitting from a requesting node to the communication system a resolution request message indicating a client to be examined, a receiving step for receiving said resolution request message in at least one other node of the communication system, and a decision step for deducing on the basis of a resolution reply message whether said client to be examined is connected to said wireless access network or to said wired access network.

Further, a communication system according to the present invention is primarily characterized in that the communication system also comprises:

means for transmitting from a requesting node to the communication system a resolution request message indicating a client to be examined, means for receiving the resolution request message in at least one other node of the communication system, and means for deciding whether said client to be examined is connected to said wireless access network or to said wired access network on the basis of a resolution reply message.

Further, a communication device according to the present invention is primarily characterized in that the communication device also comprises:

means for transmitting at least one resolution request message from a requesting node to the communication system indicating a client to be examined, and means for deciding whether said client to be examined is connected to said wireless access network or to said wired access network on the basis of a resolution reply message.

The present invention shows remarkable advantages compared to solutions of prior art. When applying the method according to the invention, clients belonging to the wireless access network can be distinguished from clients belonging to the wired access network without the need of performing manual configuration. Thus, also inserting and removing of clients is easier. By the method according to the invention, it is also possible to eliminate configuration errors which could happen if the configuration was performed manually. The node of the network can perform the checking which can be performed e.g. every time the node receives a packet which should be forwarded to a client, or a lifetime can be defined for the configuration information of a client wherein the node performs the check only if the lifetime has expired. This latter alternative can e.g. be used to reduce the amount of information to be transmitted in the communication system.

BRIEF DESCRIPTION OF THE DRAWINGS

In the following, the invention will be described in more detail with reference to the appended drawings, in which.

DETAILED DESCRIPTION OF THE PREFERRED EMBODIMENTS

Figure 1:
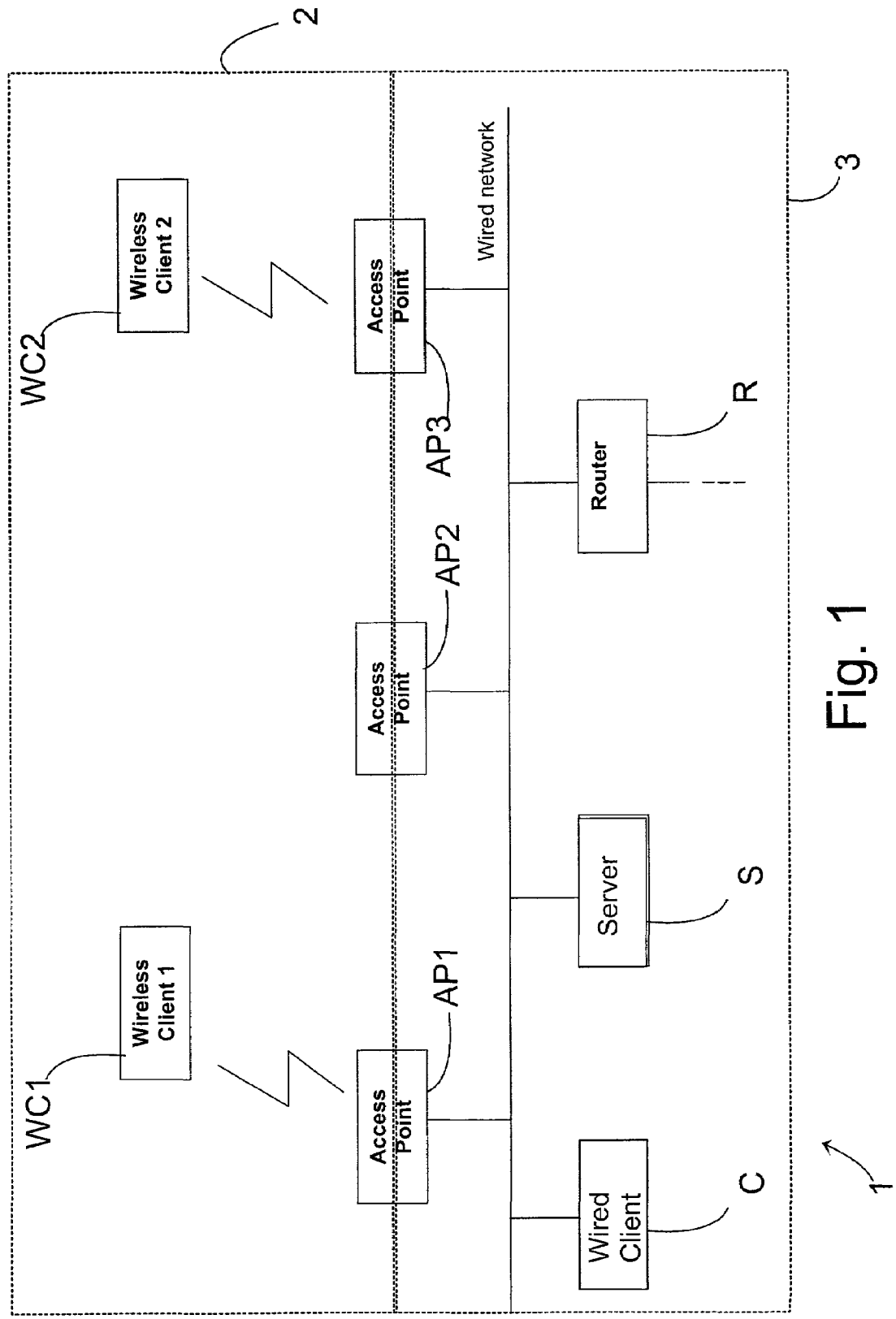
FIG. 1 shows a communication system according to an advantageous embodiment of the invention in a reduced block chart.

In the following, the invention will be described by using the WLAN as an example of the wireless access network and the Ethernet as an example of the wired access network, but it is obvious that the present invention can also be applied in connection with other communication systems, in which both wired access network(s) and wireless access network(s) are implemented. FIG. 1 shows an example of a communication system 1 according to an advantageous embodiment of the present invention. The communication system 1 comprises at least one wireless access network 2 and at least one wired access network 3. It is obvious that there may exist more than one wireless access network and/or more than one wired access network in the communication system in which the present invention can be applied.

The communication system 1 comprises access points AP1, AP2, AP3 which have transmitting and receiving means for providing communication with wireless clients WC1, WC2 and the wireless access network 2. The wireless client WC1, WC2 can, for example, be a wireless terminal having data processing means, such as a laptop PC, and wireless communication means, such as a radio modem. Some wireless access networks may comprise one or more access point controllers separate from the access points. The function of the access point controllers is to control the operation of the access points. The communication between the wireless clients and the rest of the communication system is routed via the access point controller(s). However, in FIG. 1 all the access points AP1, AP2, AP3 and (possible) access point controllers are shown as single units. The access points AP1, AP2, AP3 are directly connected to the wired network in the communication system 1 of FIG. 1, wherein all the access points AP1, AP2, AP3 can directly communicate with other access points and other devices connected to the wired access network 3.

A radio connection is arranged between the access point AP1, AP2 and the wireless clients WC1, WC2 for transmitting e.g. signals required for setting up a connection and, during the connection, information, such as data packets of an Internet application.

The wired access network 3 comprises one or more servers S, one or more routers R and it may also comprise one or more wired clients C. The server S controls the operation of the wired access network 3, and it can communicate with other devices connected to the wired access network 3. The router R is implemented in such communication systems 1 in which communication with other networks e.g. Internet is necessary. The router R routes data packets from the wired and wireless access network to other networks and, respectively, receives packets from other networks and retransmits the received packets to the intended receiver, or to another router.

In the Internet data network, a TCP/IP protocol stack is generally used, which can be divided into five functional layers. These five layers are, listed from bottom to top: the physical layer (Layer 1), the link layer (Layer 2), the network layer (Layer 3), the transport layer (Layer 4), and the application layer (Layer 5). All the nodes of the Internet data network contain at least the first three layers. Of these nodes, routers, which are primarily responsible for the couplings of the data network, do not need the transport and application layers. However, hosts, between which the actual data transmission connection is set up, contain all the said five layers. Even though all the upper level layers use the services of the underlying layer for data transmission, logically the corresponding layers of the hosts communicate with each other by using the protocol typical for the layer.

In the following, the meaning of these different protocol stack layers will be described briefly. The actual data transmission is conducted in the physical layer by using a data transmission means, such as a wireless radio network or landline cabling.

The link layer attends to solutions required by different network technologies, wherein the upper level layers do not have to know how the data transmission network used at a given time is constructed. The link layer processes different addressing and frame modes and is responsible for the data transmission between two terminals in the same communication network.

The task of the network layer is to route packets between terminals in the communication network. The network layer provides the coupling between different data networks, wherein the upper level layers do not have to know about the structure of the data network. On this network layer level, for instance protocols IP (Internet Protocol), ICMP (Internet Control Message Protocol) and IGMP (Internet Group Management Protocol) are used.

The transport layer provides a generic end-to-end data transmission connection for the application layer. The application layer uses for instance a TCP protocol (Transmission Control Protocol) and a UDP protocol (User Datagram Protocol).

The application layer protocols operate above the transport layer and provide application-specific services, such as file transfer services or access network remote login services.

Figure 6:
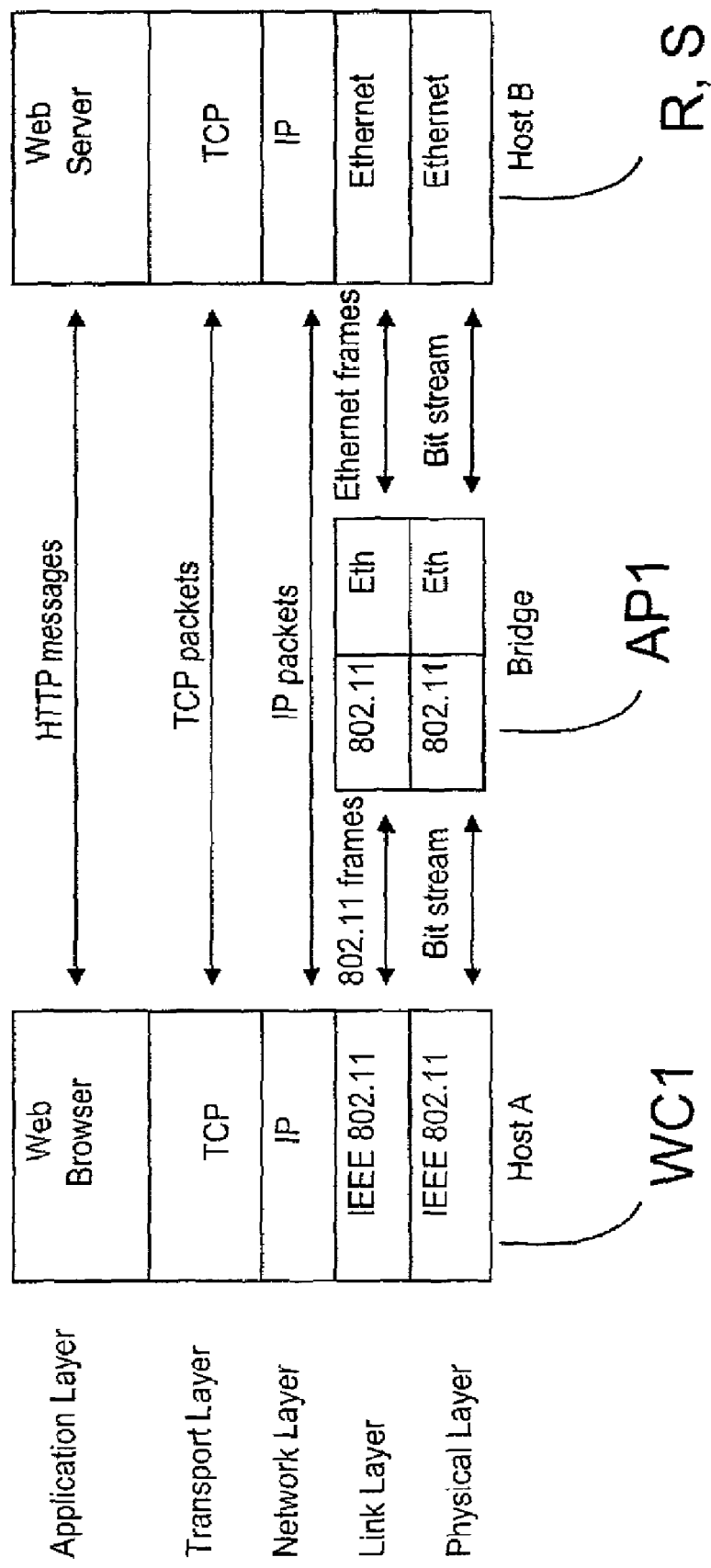
FIG. 6 shows the coupling of and data transmission between two nodes in different functional layers of a protocol stack.

The application layer protocols operate above the transport layer and provide application-specific services, such as file transfer services or access network remote login services. In the example of FIG. 6, applications running on the application layer in the wireless client WC1 and in the wired host S communicate with each other via the access point AP1. In the communication a so-called HTTP protocol (HyperText Transfer Protocol) is used in the application layer. HTTP protocol is generally used in the Internet data network for loading and presenting the data contained in so-called home pages in the display device of a computer. Other application layer protocols are, for example, Telnet, the file transfer protocol FTP and the simple mail transfer protocol SMTP.

In the Internet data network, each client or host has its own identifying IP address. The IP address is in the Internet protocol version IPv4 a 32 bit, i.e. 4 byte number which is split into an organization-specific network address and a network-specific device address. In a newer Internet protocol version IPv6, the length of the address fields is increased to 128 bits, which, in practice, means that it is possible to allocate an individual address for all the devices which are connected to the Internet data network. An Internet host connected to the Internet data network via a access network 2, 3 has either a permanently specified Internet address or the address is a dynamic address established by the access network server (for example by using dynamic host configuration protocol DHCP). If the Internet host is connected to a telecommunication network via a modem, the host has to request for an Internet address from the Internet service provider, to which the Internet host is registered. This is conducted, for example, according to a point-to-point protocol PPP. In both cases, the data is routed in the Internet to the Internet host from a client, possibly via several communication networks and routers by using the specified Internet address.

The Internet protocol IP specifies the data transmission in packets ("Datagrams"). When a host or a router receives a packet on the IP level, either from the data network or from an upper level of the protocol stack, the first step is to examine whether the packet is intended precisely for the router or client in question. If the packet is intended precisely for this router or client, the packet is transferred from the network layer to the upper layer in this node. If the packet is intended to another node, a so-called routing algorithm is executed in the network layer for concluding how the packet should be processed. First, it is examined whether the packet is intended for another node in the same network. If this is the case, the node can transmit the packet to the destination address by using the mechanisms of the link layer. Thus, the IP address of the network layer level is connected to the corresponding link layer address by using the so-called address resolution protocol ARP. In this node, the packet is also framed into a packet corresponding to the link layer and transmitted further.

If the packet is intended for another network, the routing algorithm runs through a routing table in order to find out to which address the packet should be transmitted. The routing table typically contains a so-called default address, to which all such packets are transmitted whose routing address cannot be found in the routing table.

The transmission of IP packets between different coupled data networks on the network layer level is conducted on the basis of IP addresses. In addition to the IP addresses, the devices connected to the Internet data network also have a so-called link layer address, which is also called a device address. Because terminals use link layer services in packet transmission with terminals connected to the same data network, the terminals need the address resolution protocol ARP for connecting the IP addresses to the corresponding link layer addresses. The reverse address resolution protocol RARP connects the link layer addresses to the corresponding IP addresses. The function of the address resolution protocol ARP depends on the structure of the data transmission connection used at a given time.

In such link layer level protocols which make a simultaneous connection possible between several different clients, i.e. so-called "Broadcast" connections, such as the Ethernet, the address resolution program typically uses four different messages: an ARP request, an ARP reply, an RARP request, and an RARP reply.

Figure 2:
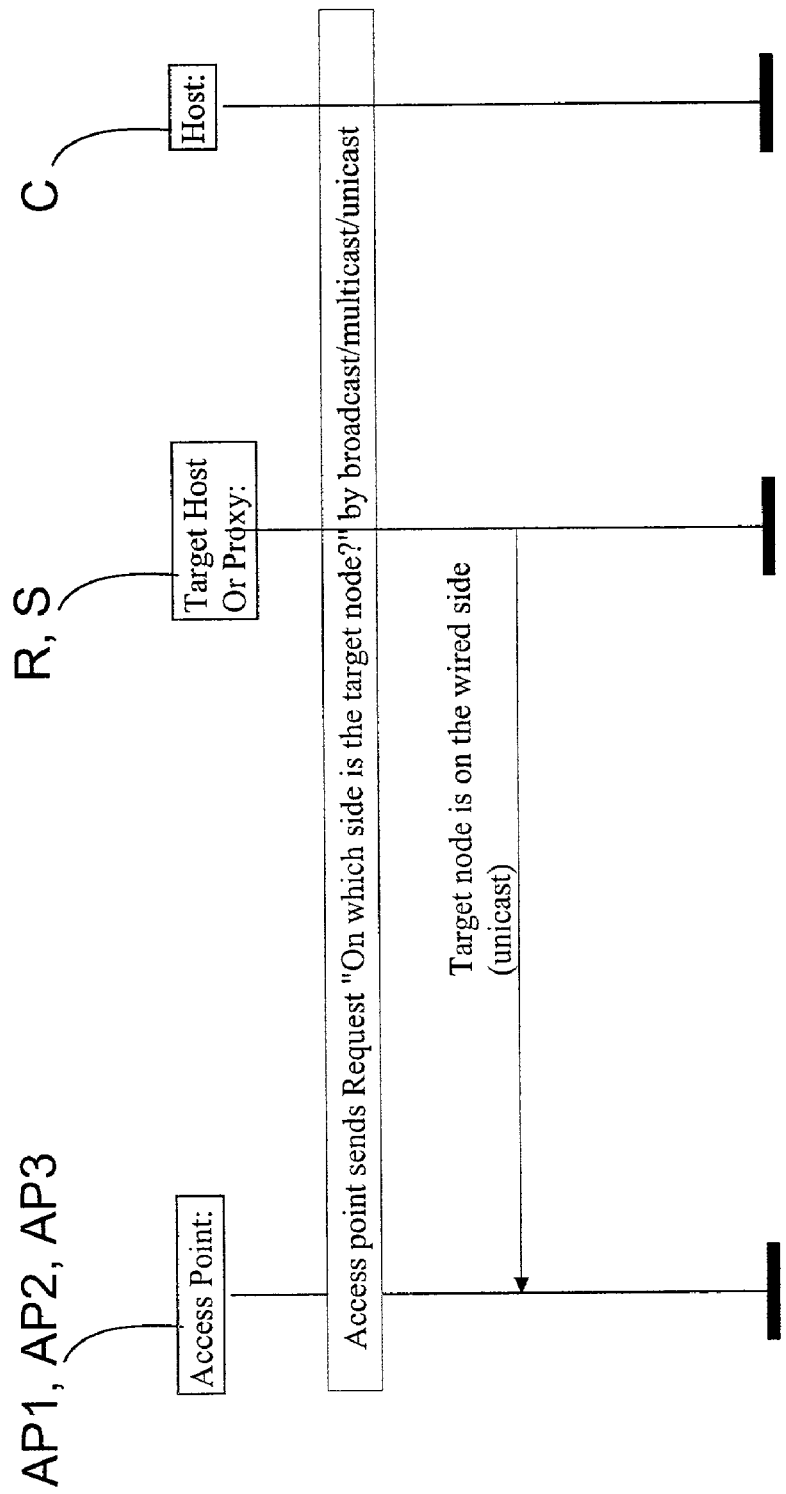
FIG. 2 illustrates as a signaling chart a method according to a first advantageous embodiment of the invention in which the method is implemented on the wireless access network.
Figure 3:
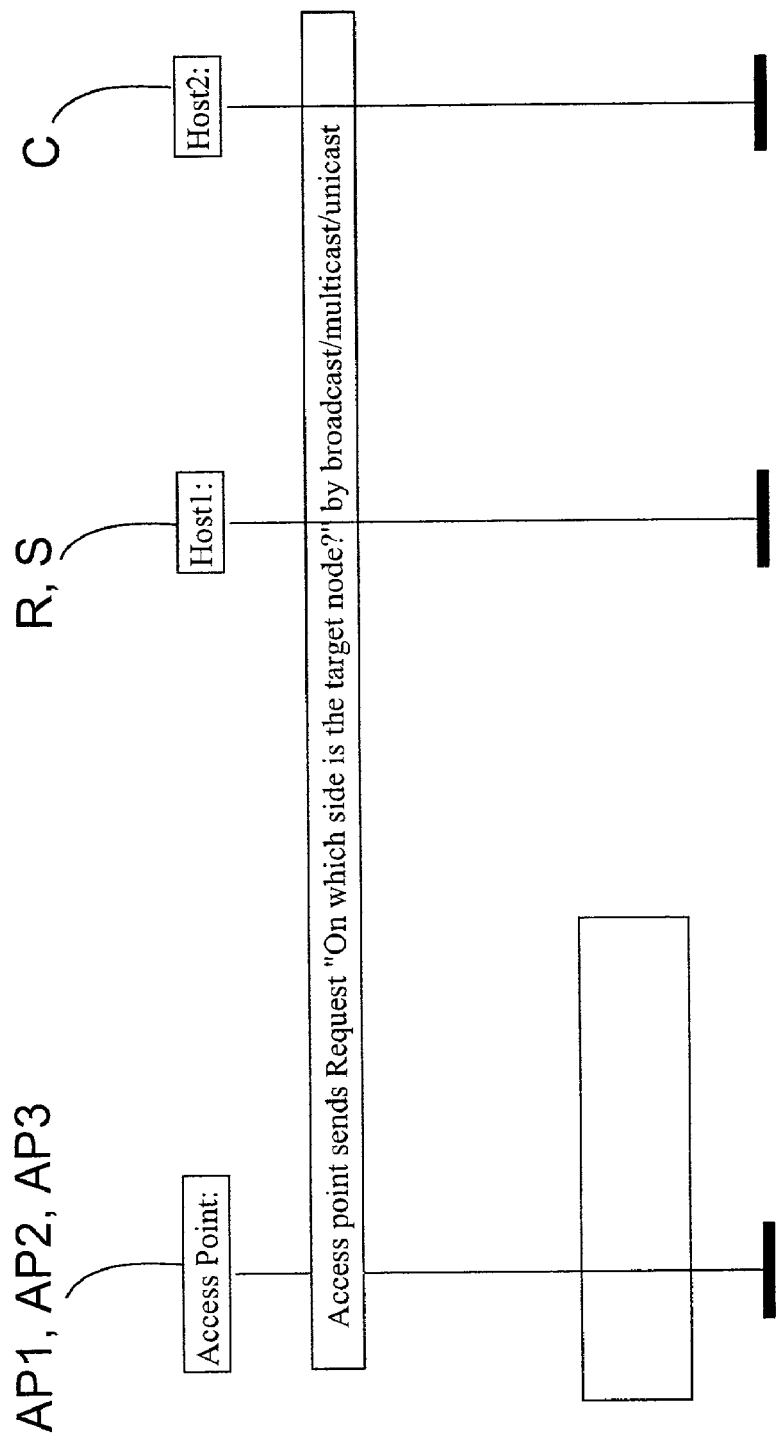
FIG. 3 illustrates as a signaling chart a method according to a first advantageous embodiment of the invention in which the method is implemented on the wired access network.
Figure 7:
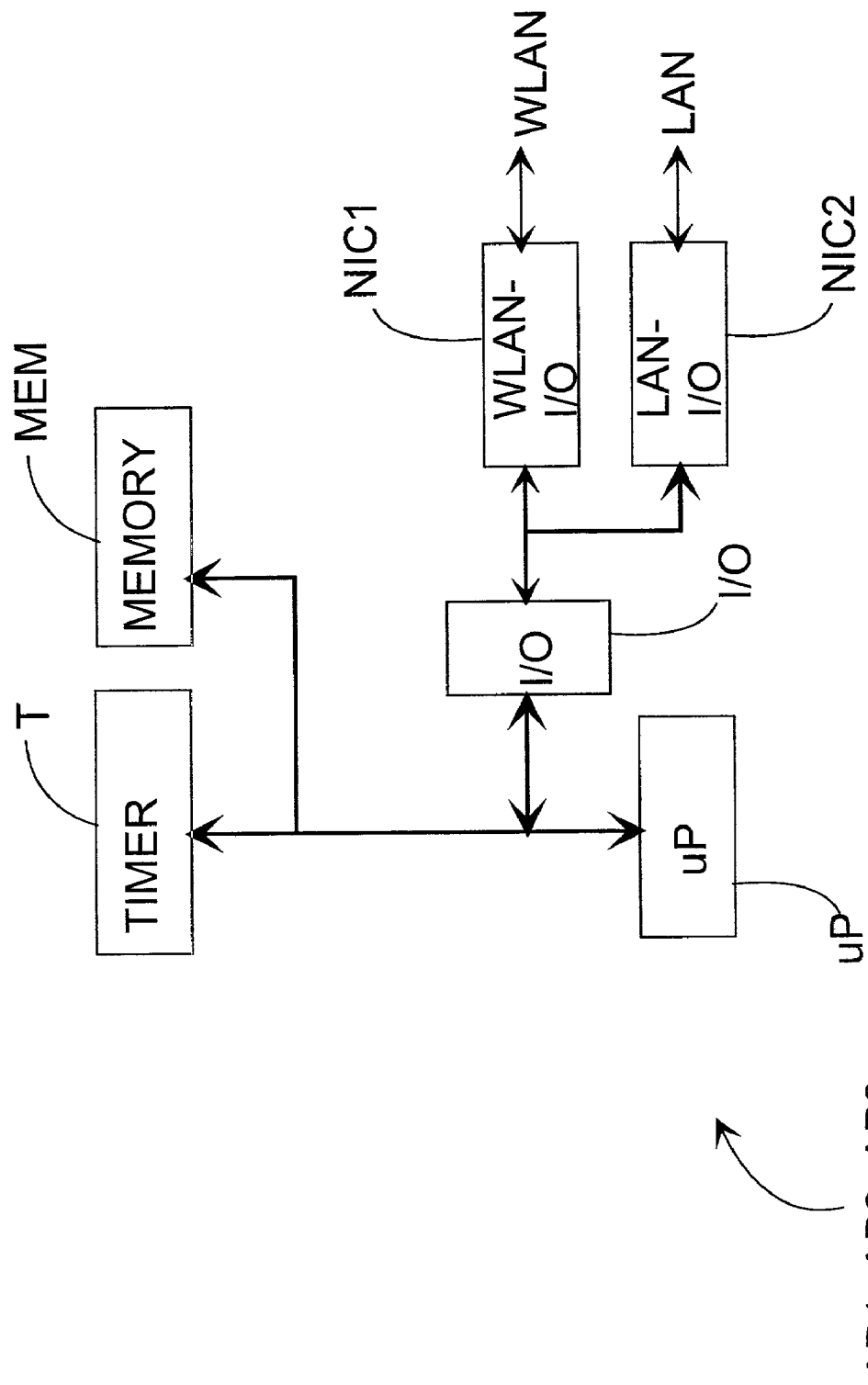
FIG. 7 shows an access point according to an advantageous embodiment of the invention in a reduced block chart.

In the following, the method according to a first advantageous embodiment of the present invention will be described with reference to the signaling diagrams of FIGS. 2 and 3. When a requesting node, such as some of the access points AP1, AP2, AP3, needs to find out whether a target node resides on the wireless access network 2 or on the wired access network 3, a resolution request message is formed in the requesting node and transmitted to the wired access network 3. If the requesting node is an access point AP1, AP2, AP3, it transmits the message over the wired network interface NIC2 of the access point AP1, AP2, AP3 (FIG. 7) to the wired access network 3. The requesting node also starts a controlling timer T (FIG. 7). The resolution request message can be transmitted as a unicast message addressed directly to the link-layer address of the target node wherein the message comprises the link-layer address of the target node. The target node is one of the access points AP1, AP2, AP3 of the wireless access network 2, or one of the wired nodes S, R of the wired access network 3. The resolution request message may also be transmitted as a multicast message wherein it comprises a special multicast address. It is also possible to use broadcast transmission wherein the resolution request message is marked as a broadcast message wherein all nodes of the wired access network 3 receive and process the message.

In a situation in which the method of the present invention is implemented in the target node and the target node is connected to the wired access network 3, the following steps are advantageously performed. When the target node AP1, AP2, AP3, S, R receives the resolution request message which is either addressed to it or is a broadcast message, the target node examines the contents of the message. The message comprises identification information of the target node. The identification information is usually the address of the target node. The target node S, R examines whether the identification information of the message equals the identification information of the target node, and if it does the target node will form a resolution reply message. The target node will then transmit the resolution reply message preferably as a unicast message to the requesting node.

The steps of the method of the present invention are advantageously implemented mainly on the link-layer level procedures of the protocol stack of the nodes. The lower level layers of the protocol stack perform necessary steps to forward the messages between physical layer and the link-layer of the protocol stack.

It is also possible that the target node cannot support the resolution request message according to the invention. In that case there may be a proxy connected in the wired access network which can handle the resolution request message. The proxy then examines if it has information of the target node. If the proxy finds such an information it will form a resolution reply message and transmit it to the requesting device.

When the requesting node receives the resolution reply message, it examines the address of the sender or some other information of the message to find out to which resolution request message the reply was transmitted. The requesting node can then determine that the target node in question is connected to the wired access network 3. The requesting node may store the resolution information of the target node into memory means MEM (e.g. cache) so that it is not necessary to send the resolution request message every time the requesting node needs to find out on which access network 2, 3 the target node is situated. The requesting node may also define a lifetime for the resolution information. Therein in a situation in which the requesting node again needs to find out on which access network 2, 3 the target node is situated the requesting node first examines if the lifetime of the resolution information is expired. If it is not yet expired the requesting node uses the stored resolution information. Otherwise, the requesting node sends the resolution request message and waits for an answer.

If the target node is not in the wired access network 3, the target node does not receive the resolution request message. Neither does any proxy of the wired access network 3 have information of the target node. In that kind of situation the resolution reply message is not transmitted in the wired access network 3, wherein the requesting node will not receive the resolution reply message as is shown in FIG. 3. The requesting node may schedule a retransmission timer for the resolution request so that the resolution request message is retransmitted a couple of times if no response has been received. According to the first advantageous embodiment of the present invention the requesting node determines that the target node in question does not belong to the wired access network 3, if the requesting node does not receive a resolution reply message within a certain time period.

The requesting node can perform the above described checking procedure for more than one target node and save the resolution information of each checked target node.

For IPv4 networks the Reverse Address Resolution Protocol (RARP) can be used in the method according to the first advantageous embodiment of the present invention. The requesting node can send a RARP request message as the resolution request message in order to resolve whether a target node is on the wired access network. Target nodes which are on the wired access network 3 can then reply with a RARP reply message, or if the replying node is a proxy on behalf of the target node, a proxy RARP reply message can be used. If RARP is used, the access points must not forward the resolution request messages over the wireless access network.

Figure 4:
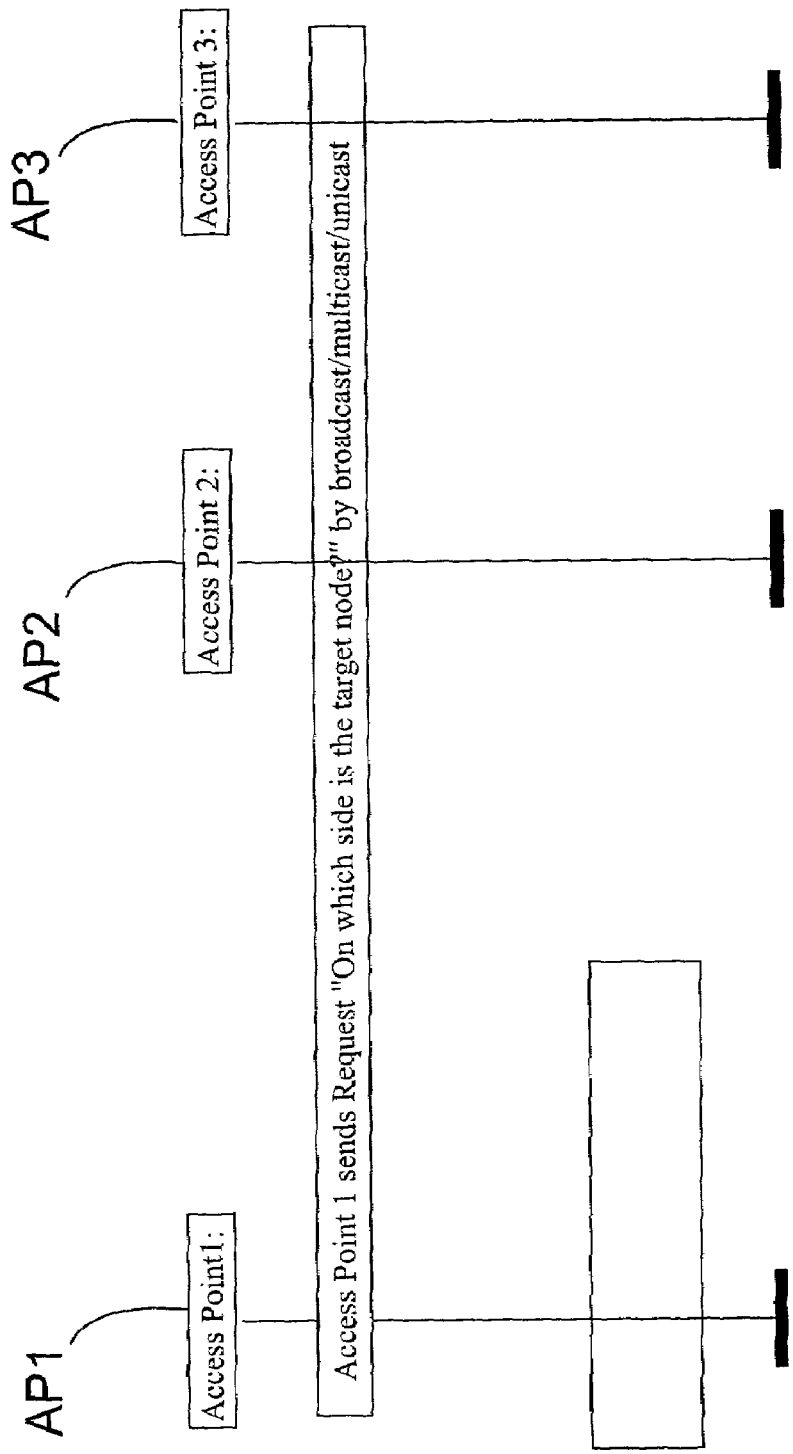
FIG. 4 illustrates as a signaling chart a method according to a second advantageous embodiment of the invention in which the method is implemented on the wireless access network.
Figure 5:
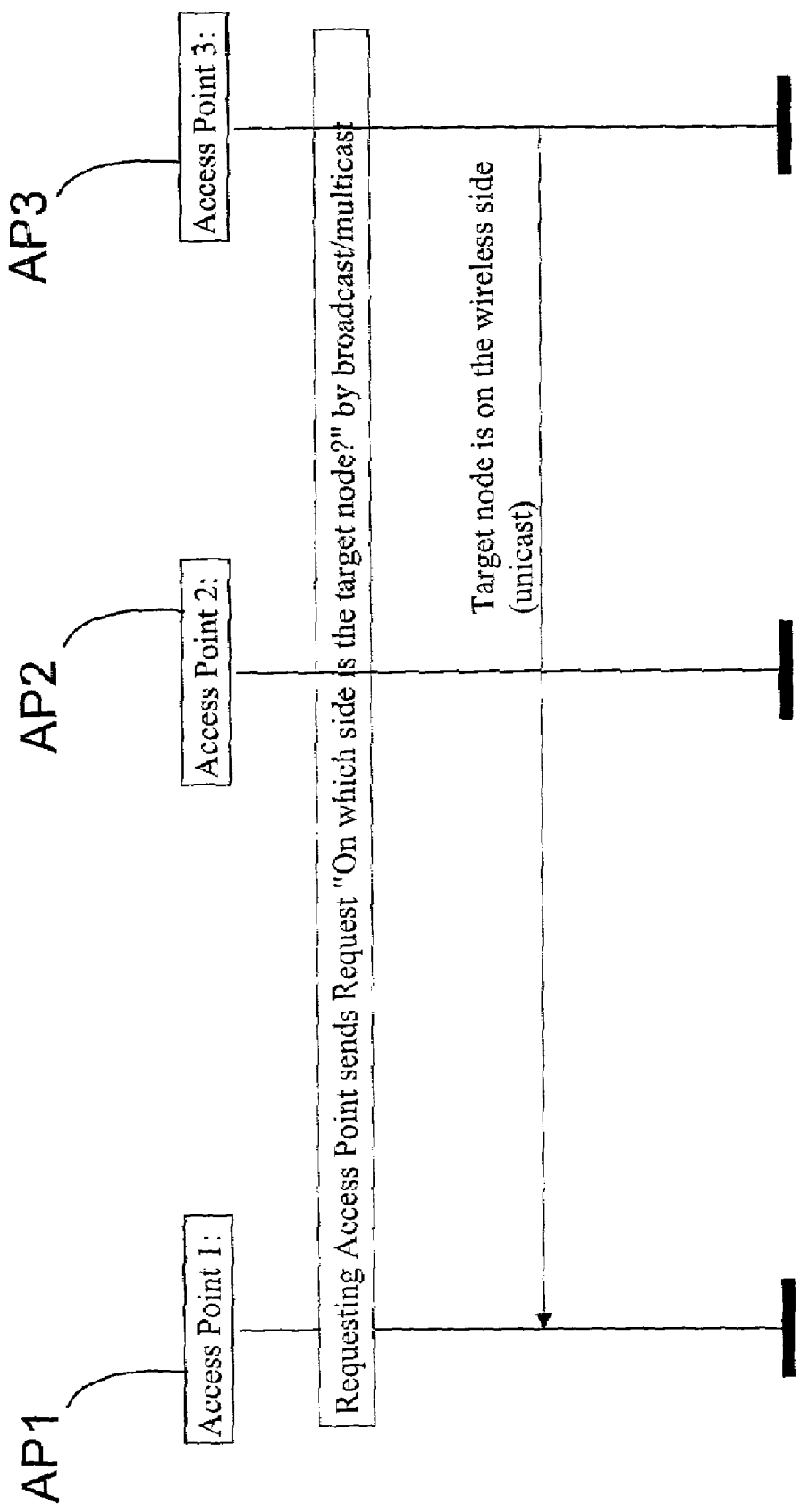
FIG. 5 illustrates as a signaling chart a method according to a second advantageous embodiment of the invention in which the method is implemented on the wired access network.

In the following, the method according to a second advantageous embodiment of the present invention will be described with reference to the signaling diagrams of FIGS. 4 and 5 and the protocol stacks of FIG. 6. When a requesting node such as some of the wired nodes S, R or access points AP1, AP2, AP3 needs to find out whether a target node resides on the wireless access network 2 or on the wired access network 3, a resolution request message is formed e.g. in the link-layer of the requesting node. Then, the requesting node transmits the resolution request message to the wired access network 3. If the requesting node is an access point AP1, AP2, AP3, it transmits the message over the wired network interface NIC2 of the access point AP1, AP2, AP3 to the wired access network 3. This resolution request message can be transmitted as a unicast message addressed directly to the link-layer address of the target node wherein the message comprises the link-layer address of the target node. The target node is one of the access points AP1, AP2, AP3 of the wireless access network 2, or one of the wired nodes S, R of the wired access network 3. The resolution request message may also be transmitted as a multicast message wherein it comprises a special multicast address. It is also possible to use broadcast transmission wherein the resolution request message is marked as a broadcast message.

The access points AP1, AP2, AP3 of the wireless access network need to maintain information of wireless clients which are associated with the access point AP1, AP2, AP3. When an access point AP1, AP2, AP3 receives the resolution request message which is either addressed to it or is a broadcast message, the message is transferred to the link-layer of the protocol stack of the access point AP1, AP2, AP3. Then the link-layer level procedures of the access point AP1, AP2, AP3 examine the contents of the message. The message comprises identification information of the target node. In the access point AP1, AP2, AP3 it is examined if the message has information of the target node. In other words, in the access point AP1, AP2, AP3 it is examined which wireless clients are connected with the access point AP1, AP2, AP3. If the identification information of the message indicates that the target node is a wireless client connected to the access point, a resolution reply message is formed in the access point AP1, AP2, AP3 and transmitted to the requesting node over the wired network interface of the access point.

When the requesting node receives the resolution reply message, message is transferred to the link-layer of the protocol stack of the requesting node. Then the link-layer level procedures of the requesting node examine the address of the sender or some other information of the message to find out to which resolution request message the reply was transmitted. The requesting node can then determine that the target node in question is connected to the wireless access network 2. The requesting node may save the resolution information of the target node so that it is not necessary to send the resolution request message every time the requesting node needs to find out on which access network 2, 3 the target node is situated. The requesting node may also define a lifetime for the resolution information. Therein in a situation in which the requesting node again needs to find out on which access network 2, 3 the target node is situated the requesting node first examines if the lifetime of the resolution information is expired. If it has not yet expired the requesting node uses the stored resolution information. Otherwise, the requesting node sends the resolution request message and waits for an answer.

If the target node is not in the wireless access network 2, no access point has identification information similar to the identification information of the resolution request message. Therefore the resolution reply message is not formed and transmitted in the wired access network 3 and the requesting node will not receive the resolution reply message as is shown in FIG. 5. The requesting node may schedule a retransmission timer for the resolution request so that the resolution request message is retransmitted a couple of times if no response has been received. According to the second advantageous embodiment of the present invention the requesting node determines that the target node in question does not belong to the wireless access network 2, if the requesting node does not receive a resolution reply message within a certain time period.

The requesting node can perform the above described check for more than one target node and save the resolution information of each checked target node.

The requesting node can use the resolution information for different purposes. For example, there may exist situations in which transmission of information should be restricted only to devices of the wired access network 3. When a node of the wired access network receives a packet which should be forwarded to a client, the node first examines the resolution information of the client. If the resolution information indicates that the client is connected to a part of the network where the packet is not allowed to be forwarded, the node will not forward the packet to the client. Otherwise the packet will be forwarded normally. In an other example situation the direct transmission between clients of the wireless access network can be prevented by examining at the access point the resolution information prior to packets from one client are forwarded to another client.

It is also possible that the resolution reply message is transmitted independent of whether the target node is a wireless client or a wired client. This is possible, for example, in a communication system 1 in which the access point AP1, AP2, AP3 transmits the resolution reply message if the target node is a wireless client, and the target node or proxy transmits the resolution reply message if the target node is a wired client. Therefore the requesting device can determine from the sender of the resolution reply message whether the target node is a wireless client or a wired client.

The appended FIG. 7 presents in a reduced manner the features of the access point AP1, AP2, AP3 which are meaningful when implementing the present invention. The hardware part includes, for instance, a microprocessor μP, memory means MEM, a connection logic I/O, and retransmission timer T.

The network interface architecture comprises a wireless network interface NIC1 and a wired network interface NIC2, by means of which the actual physical data transmission connection is established. The practical implementation of these network interfaces depends, for instance, on the type of the network interface in question. For example, a network interface card intended for a wireless access network comprises a radio modem, or the like, whereby it is possible to set up a wireless data transmission connection to the radio modem of the access network. Thus, the network interfaces NIC1, NIC2 constitute said physical layer and can also contain features of the link layer.

It is obvious that the present invention is not limited solely to the above-presented embodiments, but it can be modified within the scope of the appended claims.

What is claimed is:

1. A method for distinguishing clients in a communication system comprising at least one wireless access network and at least one wired access network, said at least one wireless access network comprising means for connecting at least one wireless client in communication to said at least one wireless access network, said at least one wired access network comprising means for connecting at least one wired client in communication to said at least one wired access network, and said communication system comprising means for communicating between said at least one wireless access network and said at least one wired access network, wherein the method comprises at least the following steps:

a transmission step for transmitting from a requesting node to the communication system a resolution request message indicating a client to be examined, a receiving step for receiving said resolution request message in at least one other node of the communication system, and a decision step for deducing on the basis of a resolution reply message whether said client to be examined is connected to said wireless access network or to said wired access network, wherein the decision on whether said client to be examined is connected to said wireless access network or to said wired access network is performed on the basis of whether said resolution reply message is received in the requesting node.

2. A method according to claim 1, wherein the method comprises further a step for examining said resolution request message in said at least one other node of the communication system and for deciding whether said resolution reply message is to be transmitted from said at least one other node of the Communication system to the communication system.

3. A method according to claim 2, wherein in the decision step an examination is performed whether said resolution reply message is transmitted from at least one other node of the communication system, wherein the decision on whether said client to be examined is connected to said wireless access network or to said wired access network is performed on the basis of whether said resolution reply message is received in the requesting node.

4. A method according to claim 2, wherein in the resolution reply message is transmitted from at least one other node of the communication system, wherein the decision on whether said client to he examined is connected to said wireless access network or to said wired access network is performed on the basis of whether said resolution reply message is transmitted from a node belonging to said wireless access network or from a node belonging to said wired access network.

5. A method according to claim 1, wherein said resolution request message indicates an address of said client to be examined.

6. A method according to claim 5, wherein said address is a link-layer address of said client to be examined.

7. A method according to claim 1, wherein a controlling time is defined, and if said resolution reply message is not received during said controlling time, said decision is performed on whether said client to be examined is connected to said wireless access network or to said wired access network.

8. A method according to claim 1, wherein a controlling time is defined a maximum repetition count is defined, and it said resolution reply message is not received during said controlling time, said resolution request message is retransmitted, if the number of retransmissions is smaller than said maximum repetition count.

9. A method according to claim 1, wherein said resolution reply message is transmitted if said client to be examined is connected to said at least one wired access network.

10. A method according to claim 9, wherein said resolution reply message is transmitted from said client to be examined.

11. A method according to claim 9, wherein said wired access network comprising at least one proxy, said resolution request message is received in said at least one proxy, wherein if said client to be examined is connected to said at least one wired access network, said resolution reply message is transmitted from said proxy.

12. A method according to claim 1, wherein said resolution reply message is transmitted if said client to be examined is connected to said at least one wireless access network.

13. A method according to claim 12, wherein said wired access network comprising at least one access point, said resolution request message is received in said at least one access point, wherein if said client to be examined is connected to said at least one wireless access network, said resolution reply message is transmitted from said access point.

14. A method according to claim 1, wherein said wired access network comprising at least one access point, wherein if said client to be examined is connected to said at least one wired access network, said resolution reply message is transmitted from said client to be examined, and if said client to be examined is connected to said at least one wireless access network, said resolution reply message is transmitted from said access point.

15. A method according to claim 1, wherein said wired access network comprising at least one proxy, and said wired access network comprising at least one access point, wherein if said client to be examined is connected to said at least one wired access network, said resolution reply message is transmitted from said proxy, and if said client to be examined is connected to said at least one wireless access network, said resolution reply message is transmitted from said access point.

16. A method according to claim 1, in which Reverse Address Resolution Protocol is used, wherein a RARP request message is used as the resolution request message.

17. A method according to claim 16, wherein a RARP reply message is used as the resolution reply message, if the resolution reply message is transmitted from said client to be examined, and a proxy RARP reply message is used as the resolution reply message, if the resolution reply message is transmitted from another node of the communication system than said client to be examined.

18. A method according to claim 1, wherein information is stored about whether said client to be examined is connected to said wireless access network or to said wired access network.

19. A method according to claim 18, wherein said information is stored in said requesting node.

20. A communication system comprising at least one wireless access network and at least one wired access network, said at least one wireless access network comprising means for connecting at least one wireless client in communication to said at least one wireless access network, said at least one wired access network comprising means for connecting at least one wired client in communication to said at least one wired access network, and said communication system comprising means for communicating between said at least one wireless access network and said at least one wired access network, wherein the communication system also comprises:
means for transmitting from a requesting node to the communication system a resolution request message indicating a client to be examined,
means for receiving the resolution request message in at least one other node of the communication system,
means for deciding whether said client to be examined is connected to said wireless access network or to said wired access network on the basis of a resolution reply message, and
means for determining whether said resolution reply message is received in the requesting node, wherein a decision on whether said client to be examined is connected to said wireless access network or to said wired access network is performed on the basis of whether said resolution reply message is received in the requesting node.

21. A communication system according to claim 20 comprising means for examining the resolution request message in said at least one other node of the communication system and for deciding whether said resolution reply message is to be transmitted from said at least one other node of the communication system to the communication system.

22. A communication system according to claim 21 comprising means for examining if said resolution reply message has been transmitted from at least one other node of the communication system, wherein said means for deciding whether said client to be examined is connected to said wireless access network or to said wired access network comprise means for performing the decision on the basis of whether said resolution reply message is received in the requesting node.

23. A communication system according to claim 21, wherein said means for deciding whether said client to be examined, is connected to said wireless access network or to said wired access network comprise means for examining whether said resolution reply message has been transmitted from a node belonging to said wireless access network or from a node belonging to said wired access network.

24. A communication system according to claim 20, wherein said resolution request message indicates an address of said client to be examined.

25. A communication system according to claim 24, wherein said address is a link-layer address of said client to be examined.

26. A communication system according to claim 20, wherein it further comprises a controlling timer to define a controlling time, wherein means for deciding whether said client to be examined is connected to said wireless access network or to said wired access network comprise means for examining said controlling timer.

27. A communication system according to claim 20, wherein it further comprises a controlling timer to define a controlling time, means for defining a maximum repetition count, and means for retransmitting said resolution request message, if said resolution reply message is not received during said controlling time and if the number of retransmissions is smaller than said maximum repetition count.

28. A communication system according to claim 20, wherein said resolution reply message is transmitted if said client to be examined is connected to said at least one wired access network.

29. A communication system according to claim 28, wherein said client to be examined comprises means for transmitting said resolution reply message.

30. A communication system according to claim 28, wherein said wired access network comprises at least one proxy comprising means for receiving said resolution request message, and means for transmitting said resolution reply message, if said client to be examined is connected to said at least one wired access network.

31. A communication system according to claim 20, wherein said resolution reply message is transmitted if said client to be examined is connected to said at least one wireless access network.

32. A communication system according to claim 31, wherein said wired access network comprising at least one access point comprising means for receiving said resolution request message, and means for transmitting said resolution repay message, if said client to be examined is connected to said at least one wireless access network.

33. A communication system according to claim 20, wherein said means for communicating between said at least one wireless access network and said at least one wired access network comprising at least one access point, wherein said requesting node is said access point.

34. A communication device comprising means for communicating with a communication system comprising at least one wireless access network and at least one wired access network, said at least one wireless access network comprising means for connecting at least one wireless client in communication to said at least one wireless access network, said at least one wired access network comprising means for connecting at least one wired client in communication to said at least one wired access network, and said communication system comprising means for communicating between said at least one wireless access network and said at least one wired access network, wherein the communication device also comprises:

means for transmitting at least one resolution request message from a requesting node to the communication system indicating a client to be examined, and means for deciding whether said client to be examined is connected to said wireless access network or to said wired access network on the basis of a resolution reply message, wherein the decision on whether said client to be examined is connected to said wireless access network or to said wired access network is performed on the basis of whether said resolution reply message is received in the requesting node.

35. A communication device according to claim 34 comprising means for examining if said resolution reply message has been transmitted from at least one other node of the communication system, wherein said means for deciding whether said client to be examined is connected to said wireless access network or to said wired access network comprise means for performing the decision on the basis of whether said resolution reply message is received in the requesting node.

36. A communication device according to claim 34, wherein said means for deciding whether said client to be examined is connected to said wireless access network or to said wired access network comprise means for examining whether said resolution reply message has been transmitted from a node belonging to said wireless access network or from a node belonging to said wired access network.

37. A communication device according to claim 34 comprising means for storing information about whether said client to be examined is connected to said wireless access network or to said wired access network.

* * * * *